(12) United States Patent
Pennaz

(10) Patent No.: US 8,294,973 B2
(45) Date of Patent: Oct. 23, 2012

(54) ELECTROCHROMIC DISPLAY SUBSTRATE

(75) Inventor: Thomas J. Pennaz, Champlin, MN (US)

(73) Assignee: Gemalto, S.A., Meudon Cedex (FR)

(*) Notice: Subject to any disclaimer, the term of this patent is extended or adjusted under 35 U.S.C. 154(b) by 1233 days.

(21) Appl. No.: 11/961,412

(22) Filed: Dec. 20, 2007

(65) Prior Publication Data

US 2009/0161194 A1 Jun. 25, 2009

(51) Int. Cl.
*G02F 1/15* (2006.01)
(52) U.S. Cl. ............................................. 359/265
(58) Field of Classification Search .......... 359/265–275; 361/760, 761; 252/500, 514, 520.3, 389.53, 252/400.53
See application file for complete search history.

(56) References Cited

U.S. PATENT DOCUMENTS

| | | | |
|---|---|---|---|
| 6,111,685 A * | 8/2000 | Tench et al. | ..................... 359/267 |
| 6,639,709 B2 | 10/2003 | Vincent | |
| 6,744,549 B2 | 6/2004 | Vincent | |
| 6,879,424 B2 | 4/2005 | Vincent | |
| 7,180,649 B2 | 2/2007 | Morrison et al. | |
| 7,229,715 B2 | 6/2007 | Costanzo et al. | |
| 7,679,599 B2 * | 3/2010 | Kawai | ........................... 345/107 |
| 7,706,046 B2 * | 4/2010 | Bauer et al. | ................... 359/267 |
| 7,965,438 B2 * | 6/2011 | Kawahara et al. | ............ 359/296 |
| 2006/0131616 A1 | 6/2006 | Devaney et al. | |
| 2006/0146271 A1 | 7/2006 | Pennaz et al. | |
| 2006/0227523 A1 | 10/2006 | Pennaz | |
| 2006/0227669 A1 | 10/2006 | Pennaz | |

OTHER PUBLICATIONS

International Search Report and Written Opinion of the International Searching Authority; Dated Feb. 12, 2009, PCT/US208/87702 (10 pgs.).

* cited by examiner

*Primary Examiner* — Ricky Mack
*Assistant Examiner* — Tuyen Tra
(74) *Attorney, Agent, or Firm* — Oliver A.M. Zitzmann

(57) ABSTRACT

A metal-plated copperless substrate for an electrochromic display. The display includes the substrate in the form of a backplane whereon circuitry of less than about 1 micron in thickness is patterned from the copperless metal. A transparent frontplane is coupled to the substrate with an electroactive ink material therebetween through which pixels may be activated to form an image for the display.

3 Claims, 4 Drawing Sheets

ELECTROCHROMIC DISPLAY SUBSTRATE

FIELD

Embodiments described herein relate to electronic display modules. In particular, embodiments of electronic display cards and other devices employing display modules of substantially copperless circuitry are described.

BACKGROUND

Bank cards, credit cards and other forms of electronic data cards have become more sophisticated over the years. In particular, it is now becoming more common to find display technology incorporated into such cards as well as other forms of smart cards, smart labels, and a variety of other devices. In this manner, such card devices may include a user-friendly display that may be employed in conjunction with the card. For example, the display may allow the card user to take advantage of security features such as one-time password (OTP) generation.

Unlike a laptop computer, personal digital assistant (PDA), or even a cell phone, electronic data cards, such as a conventional bank card, are generally lower cost items. That is, they may be mass produced and stored in bulk as "blanks", devoid of any substantial electronic data prior to activation. In the case of a bank card, customer account access information may be loaded onto the card at the time of activation, for example, by the bank teller or the customer. Barring activation, however, the card remains a small, otherwise disposable, shelved blank of minimal value, with perhaps little care afforded to its manner of storage.

In light of the nature of electronic data cards as noted above, larger, more sophisticated, higher cost, and less durable display technology options may be avoided in providing display capacity thereto. For example, higher cost liquid crystal display (LCD), organic light-emitting diode (OLED), electroluminescence (EL), field emission display (FED), and other display technologies may be avoided. Rather, as noted below, the generally more durable, lower cost option of electrochromic display technology is often preferred.

An electrochromic display is one in which an electrochemical reaction takes place through an electro-active ink material such that pixels are activated to display a pattern in the form of letters, numbers, or other symbols. The display itself is of a stacked configuration that includes a transparent conductive frontplane positioned over a backplane. The backplane serves as a substrate to accommodate copper based circuitry for creating the image of the display whereas the electro-active ink material is provided thereon, sandwiched between the backplane and the transparent conductive frontplane.

As a cost reduction measure, fabrication of an electrochromic display preferably employs printing where possible. For example, a copper based backplane may be patterned and processed to form desired circuitry. This circuitry may provide electrical conductivity, form the pixels, and provide a means to attach a microprocessor and other electronic components such as resistors. Subsequently, a dielectric insulator may be printed over the circuitry to electrically isolate circuit traces within the backplane. Additionally, printing may be employed to provide silver circuit lines, carbon resistors, adhesives and other features on the backplane. The electro-active ink material may even be provided over the backplane by way of printing.

While printing does tend to reduce processing steps and increase throughput, other aspects of fabricating the electrochromic display tend to decrease efficiency. For example, as noted above, the circuitry employed in the backplane is generally traditional copper based flexible circuitry. While copper is an excellent conductor, it may be less than ideally suited to for the formation of pixels of an electrochromic display. That is, in addition to certain topography issues, copper is susceptible to erosion by the electro-active materials and presents a challenge to forming electrical connections such as to a microprocessor via wirebonding. Thus, additional processing is often employed to cover the underlying copper circuitry. For example, processing may include additional steps to plate a gold barrier over the copper in order to avoid ultimate breakdown of the display circuitry and to allow wirebonding of the microprocessor.

Unfortunately, however, techniques for providing gold or other non-copper metals onto traditional copper based substrate add process steps to the fabrication of the display. This reduces throughput and similarly increases fabrication costs. Furthermore, the addition of copperless metals may lead to thicknesses exceeding 20-25 microns thereby presenting a significant challenge to achieving a standard resolution of about 4 mil circuit lines.

SUMMARY

An electrochromic display module is provided. The display may include a backplane with a copperless metal plated directly thereon. A transparent conductive frontplane is provided relative to the backplane such that an electro-active ink material is disbursed therebetween. The copperless metal is patterned to form conductive traces through said backplane to display pixels through said transparent frontplane.

DETAILED DESCRIPTION

Embodiments are described with reference to certain electronic display cards. In particular, techniques for fabricating an electrochromic display module of the card are described. Such modules may be employed for a variety of applications, for example, alpha-numeric displays, indicator displays and greeting card displays. Regardless, embodiments described herein employ circuitry within the module that is substantially copperless without increasing the profile thereof, while also maintaining dimensional compatibility with other module components such as microcontrollers with 5 mil or less spaced circuitry.

Figure 1:
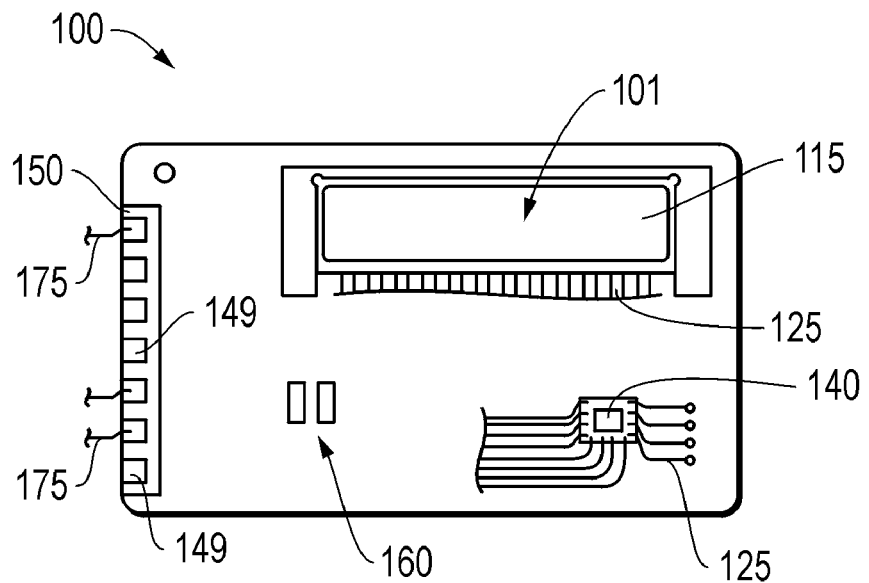
FIG. 1 is a top partially sectional view of an embodiment of an electrochromic display module of copperless circuitry for an electronic display card.

Referring now to FIG. 1, an electrochromic display module 100 is shown. The module 100 may be appropriately configured for incorporating into a conventionally sized electronic display card or other device. For example, in one embodiment the display module 100 may be a relatively flexible device less than about 1.5 square inches and suitable for integration into a standard display card of less than about 8.0 square inches, for example, via hot lamination. The thickness of the display module 100 itself may be less than about half that of a standard credit card. For example, in one embodiment the display module 100 is less than about 0.5 mm.

Figure 2:
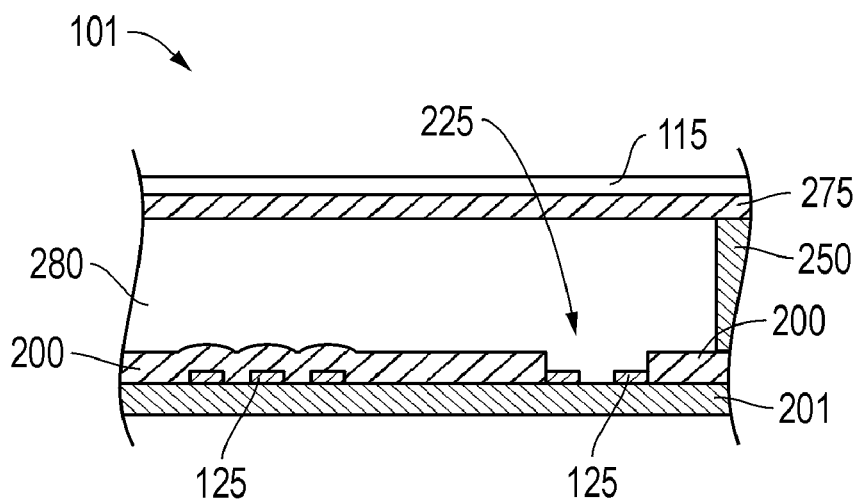
FIG. 2 is a side cross-sectional view of the electrochromic display module of FIG. 1.

Continuing with reference to FIG. 1, the module 100 may include a display portion 101 whereat a display may be generated by the activation of pixels below a conductive and transparent frontplane 115 as detailed further below. In one embodiment, the module 100 is configured to generate up to about 10 characters through a transparent polymer material serving as the transparent frontplane 115 at the display portion 101. Depictions at the display portion 101 may be directed by a microcontroller 140 incorporated directly into the body of the display module 100 at a backplane 201 thereof as depicted in FIG. 2. Similarly, other components such as resistors 160, a battery, sensor, switch, radio frequency antenna or crystal may be accommodated by the backplane 201 of FIG. 2.

A conventional bus 150 may also be incorporated into the body of the display module 100. The bus 150 may be employed to provide electrical connectivity between features of the display module 100, such as the microcontroller 140, and other features of the display card external to the module 100. For example, the bus 150 may be electrically coupled through wiring 175 to a power source or other optional components such as an additional processor, membrane switches, a biometric sensor, or an interactive read write device such as a conventional RFID antenna. In this manner, circuitry in the form of circuit lines 125 may be run from contacts 149 at the bus 150 to the microcontroller 140 and ultimately the display portion 101 for powering and generating the desired image of a display thereat.

With added reference to FIG. 2, embodiments detailed herein provide for circuit lines 125 that are both copperless and dimensionally suited for use as part of an electrochromic display module 100. For example, the above described microcontroller 140 may be prefabricated and preprogrammed with the firmware required to generate the desired image. In this manner, the microcontroller 140 may be positioned at the backplane 201 described below and connected electrically through flip chip die attach techniques and physically coupled thereto with a conventional encapsulant. However, circuitry of the microcontroller 140 may be of conventional spacing that is less than about 5 mils. Thus, in order to achieve electrical compatibility between the above noted circuit lines 125 and the circuitry of the microcontroller 140, embodiments detailed herein include techniques for achieving such spacing with the circuit lines 125, based on a substantially copperless makeup. In fact, in one embodiment, the circuit lines 125 from the microcontroller 140 into the backplane 201 may number in excess of about 40, yet be less than about 1 micron in thickness with no more than about 4 mils in spacing while also maintaining a substantially copperless makeup. In such an embodiment the circuit lines 125 may be substantially or exclusively of gold. In other embodiments however, the copperless makeup of the circuit lines 125 may be primarily of other metals such as silver, tin, platinum, palladium, chromium, zinc, or other suitable metal.

The electrochemical structure or architecture of the display portion 101 as detailed below with reference to FIG. 2, requires a relatively low voltage or current in order to generate character images. For example, image generation may be chemically induced through the structure with no more than a single microamp of current available from the circuit lines 125. Thus, while a copperless line 125 may include a degree of resistance, perhaps about 1-3 ohm/square as in the case of gold, more than enough power may be available from a conventional power source or battery incorporated within the module 100 or the electronic display card and wired to the bus 150. In one embodiment, between about 0.7 volts and about 3.0 volts of power are made available in this manner so as to be compatible with conventional parameters of the microcontroller 140.

As noted above, techniques of employing copperless circuit lines 125 are described below that are dimensionally compatible with other features of the display such as the microcontroller 140. Thus, a reconfiguration of standard microcontroller circuit dimensions may be avoided along with any sophisticated or time consuming fabrication techniques for coupling of the microcontroller 140 to the backplane 201. Rather, as indicated, a conventional flip-chip die attach of the microcontroller 140 to the backplane 201 may be employed. Similarly, the dimensional compatible copperless circuit lines 125 may be employed with other time saving fabrication techniques such as printing of a dielectric 200 directly thereover as depicted in FIG. 2 without the requirement of alternative time consuming deposition techniques.

Continuing with reference to FIG. 2, the topography of the display portion 101 is depicted. For example, pixel areas 225 and circuit lines 125 are depicted that are of the same height. Of note, is the fact that the copperless circuit materials of the display portion 101 are employed to provide device features of substantially lower profiles than available with conventional copper flex circuit techniques. For example, conventional copper flex techniques may provide circuit lines of up to about 30 microns in height with an additional dielectric height of up to about 30 microns. Thus, where dielectric is found over the circuit lines a profile of up to about 60 microns may be present. Such heights result in a fairly wide variability in display feature profiles and may take up over 50% of the display thickness.

By way of contrast to conventional flex circuitry, the copperless circuit materials and techniques as detailed herein provide the foundation for circuit lines 125 and pixel areas 225 of heights that may be less than about 1 micron. As a result, the dielectric 200 may also be of minimal thickness, for example, less than about 5 microns. Thus, with respect to the circuit lines 125, pixel areas 225, and dielectric 200, the topography may vary between about 0 and about 6 microns depending on the particular location. As a result, height variation may also be reduced along with the overall thickness (e.g. down to less than about 10% of the display thickness).

With particular reference to FIG. 2, and added reference to FIG. 1, the above described display portion 101 is of a stacked configuration. The transparent frontplane 115 is shown as the top layer of the display portion 101 with an underlying conductive layer 275 formed thereon. The frontplane 115 is mechanically joined to the backplane 201 through a variety of techniques such as, for example, pressure sensitive adhesives, heat seal and epoxy seals. In the embodiment shown, for example, a mechanical seal 250 is depicted between the frontplane 115 and backplane 201. The mechanical seal 250 may be provided at a perimeter of the display portion 101 by conventional printing techniques. In this manner, a fixed height between the backplane 201 and the frontplane 115 may be provided. Additionally, the seal 250 may act to sealingly contain electroactive-ink material 280 as described below while also providing mechanical strength to the display portion 101. The frontplane 115 and the conductive layer 275 may be electrically wired to a negative terminal of a battery and grounded, serving as the negative anode electrode for the module 100. The conductive layer 275 itself may be of gold, silver, chromium, or indium tin oxide (ITO), deposited on the frontplane 115 through conventional metallization or sputtering. The sputtered metal should result in a substantially transparent substrate for use in a display module.

A polymeric backplane 201 as noted above may be provided opposite the frontplane 115 and conductive layer 275. The polymer selected for the backplane 201 may be one of a polyester, a polyimide, polypropylene, acrylate, polyolefin, polyethylene napthalate, polycarbonate, and polyvinylchloride. Additionally, the backplane 201 and circuitry therethrough may be connected to a positive battery terminal for serving as the positive cathode electrode for the module 100. As detailed below, a chemical reaction may thus be directed between the frontplane 115 and the backplane 201, through the medium of an electro-active ink material 280, in order to generate an image at the display portion 101.

When a microcontroller is employed, the positive and negative terminals of the battery are connected electrically through circuit lines 125 directly to the microcontroller. Subsequently, power is directed to pixels 225 and the transparent conductive frontplane through circuit lines 125 from the microcontroller to said pixels and transparent conductive front plane. Preferably, the conductive surface 275 is grounded to the backplane copperless circuit lines through the use of conductive adhesives such as a conductive epoxy. In one preferred embodiment of the present invention, the use of a printed conductive adhesive serves as both the mechanical seal and provides electrical connectivity between the conductive frontplane and copperless backplane.

The electro-active ink material 280 may be a conventional electro-active ink, preferably of a non-aqueous and non-volatile variety while also prone to induction of a chemical reaction at relatively low voltages as indicated herein. A patterned dielectric 200 may be disposed over the circuit lines 125 with certain exceptions such as at pixel areas 225. As such, the microcontroller 140 of FIG. 1 may be employed to direct the above noted reactions at the pixel areas 225 of exposed circuit lines 125 where the electro-active ink material 280 is in contact therewith. Thus, a color shift may be produced at certain pixel areas 225 in order to form a pattern, thereby producing an overall image at the display portion 101. Subsequently, the image may be cleared by reversing polarity of the frontplane 115 and backplane 201. In addition to pixel areas 225, circuit lines 125 may similarly be patterned to traverse and accommodate die attach locations for the microcontroller 140, as well as resistors, current collectors for a printed battery and other features as described further below.

Figure 3A:
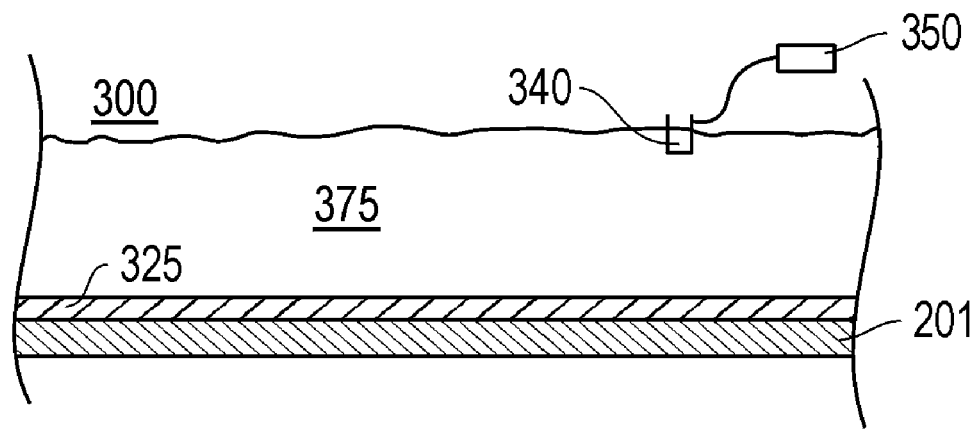
FIGS. 3A-3E are a series of cross-sectional views revealing the processing of an electrochromic display substrate to form the module of FIG. 1.

Referring now to FIG. 3A, with added reference to FIG. 2, a cross sectional view of the backplane 201 with a copperless metal layer 325 thereon is depicted. Together, these features make up the electrochromic display substrate from which an electronic display module 100 such as that of FIG. 1 may ultimately be formed. The backplane 201 may be less than about 10 mils in thickness. As described below, the copperless metal layer 325 may be of gold that is plated on the backplane 201 to a thickness of less than about 1 micron. As such, topography issues due to the use of copper may be eliminated and the placement of a subsequent dielectric 200 may be printed directly over the circuit lines 125 following their completed formation as depicted in FIG. 3E, thereby improving throughput.

Continuing now with particular reference to FIGS. 3A-3E a series of cross-sectional views are depicted revealing the processing of the electrochromic display substrate into a backplane 201 with dimensionally compatible copperless circuit lines 125 as noted above. As indicated, the elimination of copper based circuit lines eliminates the need for gold plating thereof, improving throughput. Additionally, cost reduction may be realized in that less gold or other copperless metal may be required to form the copperless circuit lines 125 than would be required in plating of copper based circuit lines with the gold.

Referring now to FIG. 3A, the above described backplane 201 is positioned within a plating chamber 300 with an environment of less than about 400 psig. As indicated above, the backplane 201 may be of a variety of polymers selected based on the processing conditions to be encountered as well as the application environment within which the ultimate electronic display card is to operate. For example, embodiments of the backplane 201 are often of materials that are inert, heat stable, highly dielectric, and low cost.

As depicted in FIG. 3A, the backplane 201 may act as a substrate upon which a copperless metal layer 325 of less than about 1 micron in thickness may be formed as described herein and/or according to techniques detailed in U.S. application Ser. No. 11/018,948, Copperless Flexible Circuit (Devaney, et al.), incorporated herein by reference in its entirety. Thus, a novel electrochromic display substrate may be provided. Continuing with reference to FIG. 3A, the backplane 201 may be pre-treated at a surface thereof prior to placement within the chamber 300. For example, plasma or thermal treatment may be applied to the surface of the backplane 201 to improve adhesion thereof to a thin copperless metal layer. Additionally, a tie layer of chrome, nickel, or an alloy thereof may be applied to a surface of the backplane 201, again for improving adhesion thereof to a very thin layer of copperless metal.

Once positioned with the chamber 300, the copperless metal layer 325 shown in FIG. 3A may be deposited by electroplating or electrodeposition wherein copperless metal ions are drawn from the plating solution 375 to form the metal layer 325. In the embodiment shown, the plating solution 375 may include up to about 50 g/l of the metal to be deposited, provided by a salt of the metal dissolved within the solution 375. That is, the solution 375 may include dissolved salts of gold, silver, tin, platinum, palladium, chromium, zinc or other suitable copperless metal salts. Additionally, dopants and other additives may be included in the plating solution 375 for tailoring characteristics of the layer 325 and ultimately the copperless circuit lines 125 (e.g. of FIG. 3E). In order to achieve electroplating of the metal from the plating solution 375 to the surface of the backplane 201, a plating anode 340 may be energized by a conventional current induction source 350. In this manner, the backplane 201 may act as a cathode, drawing metal ions from solution 375 to its surface.

The above described technique of electrodeposition to form the copperless metal layer 325 may be employed to achieve a thickness of no more than about 1 micron as indicated. Additionally, in alternate embodiments, sputtering, evaporation deposition, or other suitable techniques may be employed to achieve a copperless metal layer 325 of such a thin profile on the properly pre-treated backplane 201. Regardless, an electrochromic display substrate made up of the backplane 201 with such a thin copperless metal layer 325 thereon may be particularly suited to take advantage of printing techniques for accommodating subsequent material layers and processing thereon.

Figure 3B:
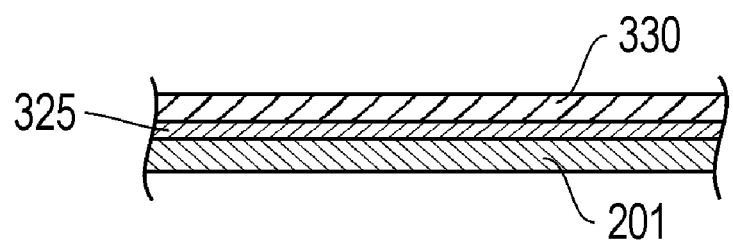
Figure 3C:
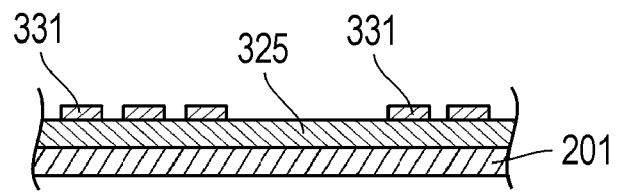
Figure 3D:
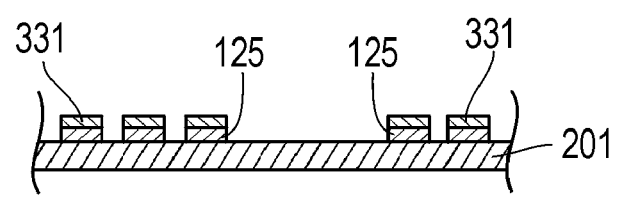
Figure 3E:
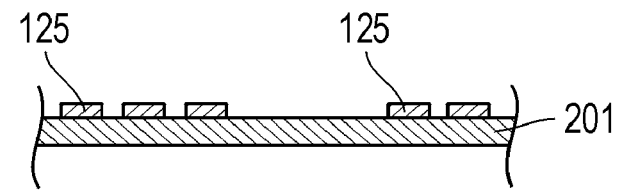

Continuing with reference to FIG. 3B, a photoresist layer 330 may be printed, laminated, or coated onto the copperless metal layer 325 in order to begin patterning circuitry therefrom. In accordance therewith, select portions of the photoresist layer 330 may be exposed to ultraviolet (UV) light or other appropriate patterning technique applied, such that subsequent solvent development leaves behind the patterned photoresist 331 as depicted in FIG. 3C. For example, in one embodiment employing an aqueous photoresist, a dilute sodium or potassium carbonate based solution may be employed as a solvent to wash away UV exposed portions of the photoresist layer 330, thus, leaving behind the patterned photoresist 331.

Continuing with reference to FIGS. 1C and 1D, the copperless circuit lines 125 may now be formed by etching away of exposed portions of the copperless metal layer 325 (i.e. those portions lacking patterned photoresist 331 thereabove). This may be achieved by use of a conventional etchant. For example, where the copperless metal layer 325 is of gold, thiourea, ferro/ferricyanide etchants, or a triiodide-based etchant may be employed. Subsequently, as depicted in FIG. 3E, the patterned photoresist 331 may be removed by conventional means, leaving behind the patterned substrate of backplane 201 with copperless circuit lines 125. In one embodiment this may be achieved by washing in a dilute solution of alkaline metal hydroxide.

Continuing with reference to FIG. 3E, with added reference to FIG. 2, an electrochromic display substrate has been formed that includes the described backplane 201 with patterned copperless circuit lines 125 thereat. In spite of the lack of copper, these circuit lines 125 are of a profile that is below about 1 micron with substantially less than about 5 mils of spacing required therebetween. A dielectric 200 may then be provided to insulate the individual circuit lines 125 except in locations where electrical exposure is desired (e.g. see the pixel area 225 of FIG. 2). As described below, a result of the thin profile of the circuit lines 125 is that the dielectric 200 may be efficiently printed directly thereover, for example to a thickness of less than about 6 microns (see 440). Printing of the dielectric 200 in this manner, heretofore an unavailable option, is now possible due to the minimal thickness achieved for the circuit lines 125 in spite of their gold or other non-copper makeup.

Figure 4:
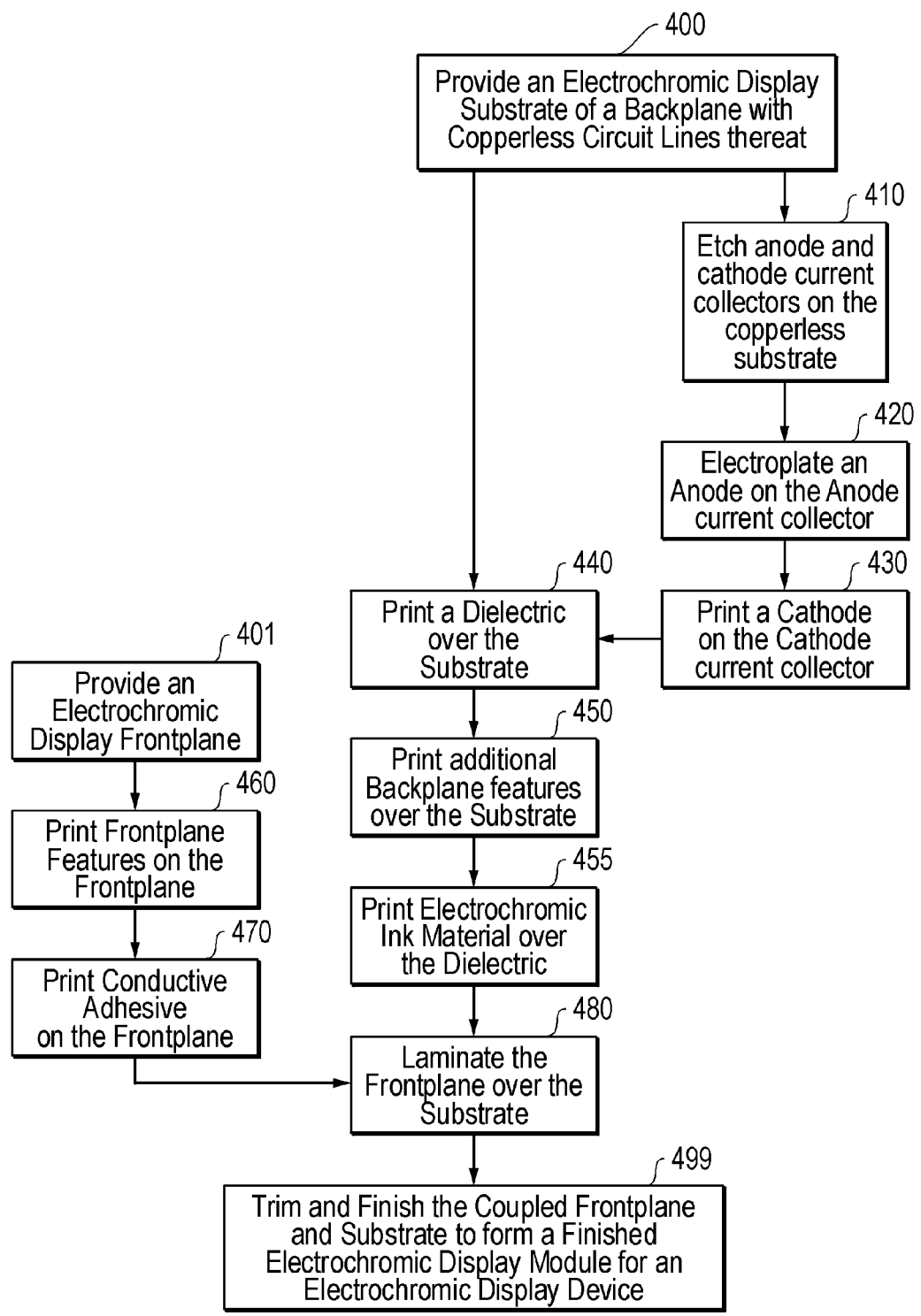
FIG. 4 is a flow-chart summarizing an embodiment of forming an electronic electrochromic display device from a frontplane and the substrate of FIG. 3E.

Referring now to FIG. 4, an embodiment of forming an electrochromic or electronic display device from the processed substrate of FIG. 3E is described. As with conventional electronic display cards, a transparent electronic display frontplane may be provided as described above and at 401. Electronic features of the frontplane such as a conductive layer of ITO and a silver bus bar may be printed thereon along with a conductive adhesive as indicated at 460 and 470. In this manner, a frontplane may be made available for physical coupling to an electrochromic display substrate as described below.

The electrochromic display substrate as shown in FIG. 3E initially includes a backplane with copperless circuit lines therethrough which is provided as detailed above and depicted at 400. As indicated, the thin profile of the circuit lines allows for the printing of a dielectric thereover with a thickness of less than about 5 microns as noted at 440. However, in conjunction with patterning of the circuit lines, other electronic features of the device may be patterned in advance of the printing of the dielectric. For example, in one embodiment, battery components may be provided as indicated at 410, 420, 430. That is, anode and cathode current collectors may be etched into the copperless substrate as indicated at 410 followed by electroplating of the anode and printing of the cathode on their respective current collectors as indicated at 420, 430.

In an embodiment where the patterned metal of the substrate is gold, a thin isolated zinc anode may be plated thereon due to the compatibility of the materials (see 420). The anode may be electrically coupled to remaining circuitry with the printing thereon of a conventional silver conductive trace at 450. The cathode is formed by printing a manganese carbon ink over the cathode current collector formed from the copperless circuit material. Thus, a substantially printed solution for providing the battery for the electronic display card is provided when employing such copperless metal as indicated.

With reference to the battery formation detailed above, a battery consists of an anode, cathode and electrolyte. The battery can be constructed using various anodes, cathodes and electrolytes which depend on an electrochemical reaction to generate power. In the case of a carbon zinc battery, the anode metal is zinc, the cathode material is manganese carbon and the electrolyte is a zinc chloride solution. The anode and cathodes are produced in intimate contact with a conductive surface known in the art as a current collector. The anode and cathode current collectors provide the means to electrically connect the battery to a circuit such that the power generated can be harnessed.

Traditional carbon zinc batteries use zinc foils which function as both the anode material and the current collector. Efforts to produce a printable zinc ink suffer from very poor conductivity which results in poor battery performance. Placing discreet foil in a display card is very labor intensive and impractical. However, embodiments of employing a copperless substrate as detailed herein allow for the easier formation of current collectors for both the anode and cathode. The copperless circuit is configured to provide a plating bus to allow conventional electroplating to selectively plate zinc metal on the anode current collector thereby forming the battery anode. The copperless circuit which forms the anode current collector is electrically isolated from the rest of the circuit to prevent the plating of zinc across the entire circuit; which is subsequently connected through printing of a silver circuit after the plating. The cathode may then be produced by printing a carbon/manganese ink over the copperless cathode current collector. The cathode current collector may be connected electrically to the display module circuitry and without requiring a silver printed circuit line to re-connect. Carbon zinc batteries produced according to this technique may be of about 1.5 volts per cell. Thus, in the case where 3 volts is required to meet microprocessor requirements, two batteries would be produced and connected in series electrically to produce the desired 3.0 V.

In addition to the battery, other electronic components such as attach locations for a microprocessor, sensor, crystal, or radio frequency (RF) antenna may be patterned into the copperless substrate. A switch may also be produced using the copperless circuit material. While this is impractical with traditional copper based flexible circuits, the low cost of the copperless substrate allows for the formation of the complete card components on the copperless substrate. In the case of the switch, a protective layer of either conductive silver or carbon is printed over the copperless circuit traces to minimize wear on the copperless circuit material during switch activation.

As noted at 440 and above, the electronically insulating dielectric may be effectively printed on the patterned backplane circuitry due to the minimal profile obtained in forming the copperless circuitry. The dielectric itself may also be patterned, for example to expose certain areas of the circuitry (e.g. leaving pixel areas 225 as shown in FIG. 2). Subsequently, silver jumpers, the above noted battery, resistors, and other electronic features of the backplane may be printed over the dielectric as indicated at 450. Adhesives may also be provided by printing for later joining of the front and backplane. Such adhesives may be conductive to provide electrical connection between the conductive surface of the front plane and the backplane. With the underlying features and option adhesives provided, the electro-active ink material may then be provided thereover as indicated at 455.

Once the backpane, circuitry, dielectric, ink, and other features thereof have been provided, the frontplane may be laminated thereto as indicated at 480. With the frontplane and processed backplane now physically coupled, conventional trimming and finishing thereof may be employed to complete the electrochromic display module as indicated at 499.

The electrochromic display module of substantially copperless circuitry may now be incorporated into a variety of electronic display types for a host of end applications. The module may be flexible and robust enough to be integrated into a variety of card types, labels, vacuum-formed or injection molded parts, for example, by way of pressure or hot lamination. Additional features may be similarly integrated into such devices, and may include electronic coupling to the module. For example, additional processors, batteries and other features outside of the module may be provided to a module containing device by conventional pick and place techniques and similarly integrated therewith.

Techniques described hereinabove include the plating of gold or other non-copper metals onto a substrate that results in a metal layer that is of a suitable thickness so as to be practical for use in patterning circuitry for an electrochromic display module. For example, a gold plated backplane may be provided wherein a gold layer of no more than about 1 micron. Thus, the patterning thereof into circuitry leaves lines that are generally less than about 5 mils in width and spacing. As a result, conventional electronic device features, such as a microcontroller for the module, may be employed which match such circuit dimensions.

A variety of printing techniques may also be utilized in the fabrication of the display module. For example, screen and/or stencil printing may be employed to produce electronic features such as membrane switches. Such techniques may include the use of ink deposits which range in thickness from about 10 microns up to thicknesses exceeding 100 microns. Other print techniques such as flexography and gravure may be employed to produce thinner ink thicknesses, typically between about 2 microns up to about 6 microns. The use of the substantially copperless substrate as detailed herein above allows for the use of both flexography and gravure to print features such as the dielectric and silver circuits. In this manner, the overall topography in the display area may be kept to a minimum as well as topography variances. Additionally, a host of other printing techniques may be employed in conjunction with the substantially copperless substrate to produce a variety of features tailored to particular ink thicknesses and other resolution requirements.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest scope.

I claim:

1. A method of forming an electrochromic display device, the method comprising:
    providing an electrochromic display substrate of a backplane with patterned copperless circuit lines thereat;
    coupling a frontplane over the electrochromic display substrate;
    wherein the patterned copperless circuit lines are less than about 1 micron in thickness, the method further comprising printing a dielectric over the electrochromic display substrate prior to said coupling;
    printing a conductive adhesive on the frontplane prior to said coupling;
    printing electrochromic ink material over the dielectric prior to said coupling; and
    curing the conductive adhesive after said coupling to stabilize the frontplane to the electrochromic display substrate.

2. A method of forming an electrochromic display device, the method comprising:
    providing an electrochromic display substrate of a backplane with patterned copperless circuit lines thereat;
    coupling a frontplane over the electrochromic display substrate;
    wherein the patterned copperless circuit lines are of gold, the method further comprising:
    etching an anode current collector and a cathode current collector into the electrochromic display substrate;
    electroplating an anode battery component at a location on the electrochromic display substrate; and
    printing a cathode battery component on the cathode current collector.

3. The method of claim 2 wherein the anode battery component includes zinc and the cathode battery component includes carbon manganese.

\* \* \* \* \*

UNITED STATES PATENT AND TRADEMARK OFFICE
CERTIFICATE OF CORRECTION

| | | |
|---|---|---|
| PATENT NO. | : 8,294,973 B2 | Page 1 of 1 |
| APPLICATION NO. | : 11/961412 | |
| DATED | : October 23, 2012 | |
| INVENTOR(S) | : Thomas J. Pennaz | |

It is certified that error appears in the above-identified patent and that said Letters Patent is hereby corrected as shown below:

On the Title Page: Item (56), under "OTHER PUBLICATIONS", in column 2, line 2, Delete "PCT/US208/87702" and insert -- PCT/US2008/87702 --, therefor.

In the Specifications:

In column 5, line 9, Delete "napthalate," and insert -- naphthalate, --, therefor.

In column 9, line 4, Delete "backpane," and insert -- backplane, --, therefor.

Signed and Sealed this
Fifth Day of March, 2013

Teresa Stanek Rea
*Acting Director of the United States Patent and Trademark Office*